June 7, 1966    C. P. VAN DIJK    3,254,474
RECOVERY OF HALOGEN
Filed April 15, 1963
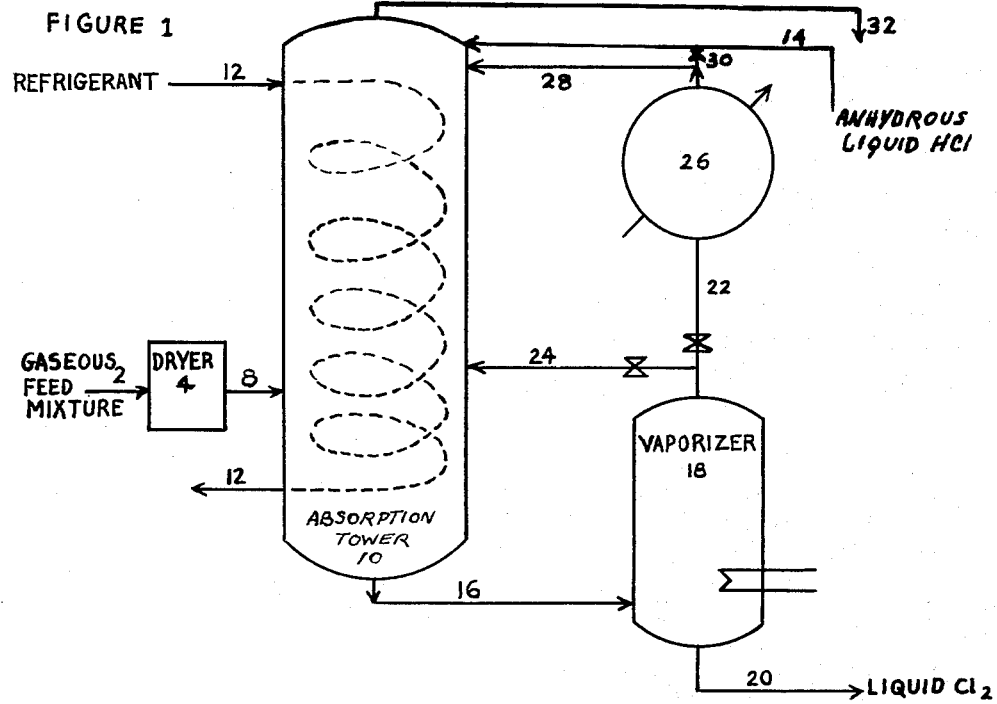
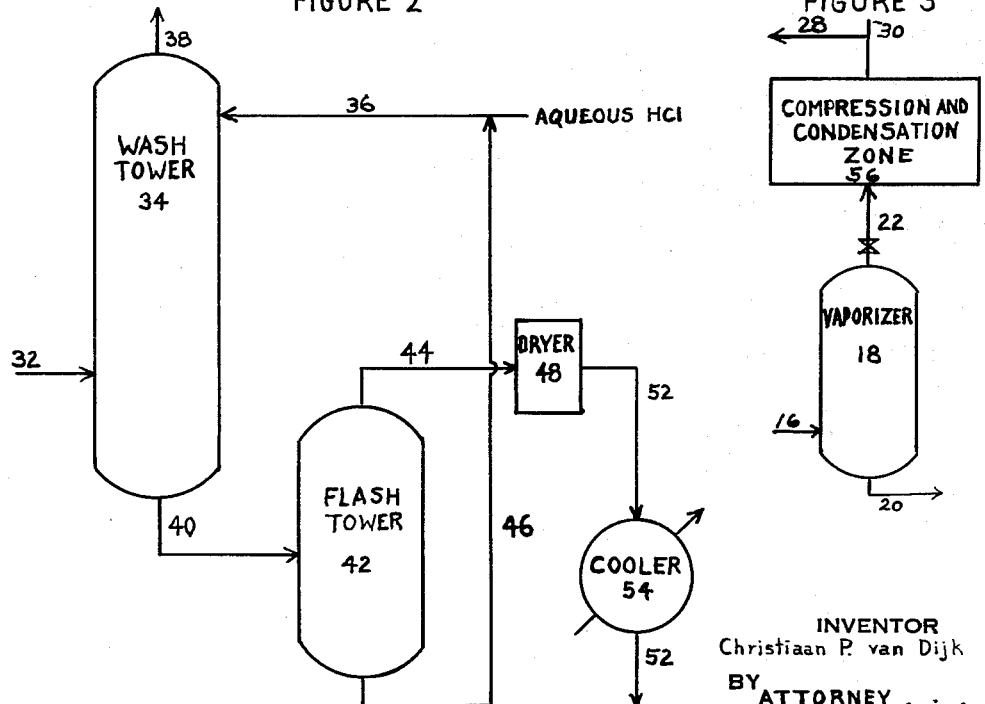
INVENTOR
Christiaan P. van Dijk
BY ATTORNEY
AGENT

United States Patent Office 3,254,474
Patented June 7, 1966

3,254,474
RECOVERY OF HALOGEN
Christiaan P. van Dijk, Westfield, N.J., assignor to Pullman Incorporated, a corporation of Delaware
Filed Apr. 15, 1963, Ser. No. 272,847
10 Claims. (Cl. 55—50)

This invention relates to the recovery of halogen from an inorganic mixture containing halogen. More particularly, this invention relates to a method wherein a hydrogen halide stream containing halogen is treated with hydrogen halide in the liquid phase to remove the halogen from its gaseous mixture by absorbing it in the liquid hydrogen halide.

This invention has particular application to gaseous reactor effluent streams containing hydrogen chloride, inert materials such as nitrogen, carbon monoxide, etc., and chlorine. These gaseous effluents may be obtained from a Deacon reaction wherein the gaseous product mixture is removed from the reactor and dried so that the product mixture is substantially anhydrous.

Other processes heretofore employed in this field have been troubled with the recovery of halogen or chlorine from such a mixture by reason of corrosive effluents formed in the separation and/or expensive extracting agents, foreign to the process, which leave contaminating traces in the product recovery.

It is, therefore, an object of the present invention to overcome the difficulties enumerated above and to provide a more efficient process for the recovery of halogen which is commercially feasible.

Another object of this invention is to provide a process for the recovery of chlorine from a hydrogen chloride-inert gaseous mixture.

Still another object of this invention is to provide a process which eliminates the formation of corrosive mixtures in the separation and recovery of halogen product.

These and other objects and advantages of the present invention will become apparent to those skilled in the art from the accompanying description and disclosure.

According to this invention, a gaseous inert mixture containing halogen gas product is passed to a treating zone wherein it is contacted, preferably in a countercurrent manner, with anhydrous hydrogen halide under sufficient pressure to maintain its liquid state at the temperature employed in the tower. Under these anhydrous conditions, the halogen gas is absorbed in the liquid hydrogen halide and the disadvantages of corrosive aqueous mixtures and need for special acid-resistant apparatus is avoided in the recovery.

The gaseous effluent stream wherein halogen is admixed with hydrogen halide and inert gases such as nitrogen, carbon monoxide, oxygen, etc., is preferably an effluent stream obtained from the oxidation of hydrogen chloride to produce chlorine. This effluent from the oxidation reactor is subjected to drying by treatment with sulfuric acid, calcium chloride, or any other convenient means. In the present invention, the substantially anhydrous effluent is then introduced into a tower wherein it is contacted with liquid hydrogen halide, the acid containing the same halogen as the halogen to be extracted. The temperature and pressure in the tower is such that the liquid state of the hydrogen halide in maintained during treatment. Preferred conditions in this treating zone include a pressure between about 50 p.s.i.g. and about 200 p.s.i.g. and a temperature between about —100° C. and about 0° C. This temperature in the tower is maintained partly by refrigeration coils and partly by recycle of cold hydrogen halide liquid as subsequently described.

A preferred method of treatment comprises introducing the gaseous effluent to the lower portion of the tower and countercurrently contacting it with liquid hydrogen halide which has been introduced into the upper portion of the tower. In this way the gaseous effluent, in its upward passage, is gradually cooled until it meets fresh incoming liquid hydrogen halide whereupon it is cooled to its exit temperature, preferably between about —80° C. and about 0° C. The gaseous hydrogen halide and inert materials of the effluent are withdrawn from the upper portion of the treating tower and discarded, or the hydrogen halide can be recovered from this gaseous mixture for instance, by absorption, in a separate zone in an aqueous solution of the hydrogen halide. The absorption operation can be carried out in an adiabatic manner. The hydrogen halide, then, can be regenerated by heating the concentrated solution to vaporize the hydrogen halide and drying the gas evolved. If desired, this recovered portion of hydrogen halide can be recycled to the treating tower after adjusting the temperature to that employed therein. The liquid portion of the hydrogen halide treating media together with absorbed halogen is withdrawn from the lower portion of the treating zone and the halogen is recovered therefrom by heating the mixture to remove the hydrogen halide as a gas or by stripping the mixture with an inert gas such as nitrogen, oxygen, etc. In this way, pure liquid halogen product is obtained. The evolved hydrogen halide gas, together with some of the halogen product, can then be used to reboil the tower and is then recontacted with additional quantities of hydrogen halide liquid in the absorption zone.

At least part of the cooling necessary in the absorption or treating zone can be provided by cooling coils and the refrigerant medium in the coils can be liquid hydrogen halide, Freon, or any other suitable refrigerant. Additional cooling is obtained as a result of hydrogen halide vaporization upon contact with the gaseous mixture containing halogen in the absorption zone. In this step, a major portion of the liquid hydrogen halide is vaporized and the chlorine in the anhydrous gaseous mixture is condensed. The liquid withdrawn from the bottom of the absorption zone contains between about 0.01 and about 10 mole percent, preferably between 0.03 and 5 mole percent of liquid hydrogen halide, the remainder being halogen product. The large quantity of hydrogen halide vaporized in the absorption zone reduces the required area of indirect heat exchanger cooling surfaces and the cooling operation has a more uniform effect due to heat exchange by direct contact. Generally, the liquid hydrogen halide absorption medium is introduced into the top of the absorption tower at a temperature between about —100° C. and about —10° C., although somewhat higher temperatures, for example, 0° C., can be tolerated.

The liquid mixture of hydrogen halide and halogen withdrawn from the bottom of the absorption tower is preferably flashed to separate the hydrogen halide as a gas from the remaining liquid halogen product. If desired, the liquid halogen product thus recovered, can be flashed at a lower pressure so that the product can be obtained in the vapor state. An economical method for accomplishing this purpose, is to pass the purified liquid halogen stream from the flashing zone in indirect heat exchange with the vapors removed from the flashing zone so that the hydrogen halide is condensed and the chlorine product is vaporized. This operation reduces the cooling requirements in the system and provides a simple and economic method for recovering vaporous chlorine when, for example, it is desirable to recover the halogen product as a gas for direct use in a subsequent reaction.

The process of this invention provides an economical and efficient method of continuously ejecting inert diluents from the overall process of manufacturing halogen. Because of this advantage, pretreaters for purifying feed streams to the reaction where hydrogen halide is oxidized, can be eliminated and also the oxidation reaction can be accomplished with air instead of pure oxygen as required by previous commercial processes without the necessity of using organic absorbents or solid absorbents. Still another advantage in this simplified method for recovering halogen is that the halogen product is recovered in a pure, dry state without expensive condensing apparatus.

The following example is presented to illustrate a specific embodiment of the present invention and should not be construed in any way limiting to the scope of this invention.

*Example*

Into a brick-lined reactor are fed 82 moles of hydrogen chloride and 100 moles of air at a rate of 182 pound moles per hour. The reactant gases are contacted at a gradually increasing temperature of from 430° C. to 485° C., under 130 p.s.i.g. in the presence of a Deacon catalyst, in this particular example, chromia on alumina catalyst. The effluent gases containing nitrogen, carbon monoxide, water, oxygen, unconverted hydrogen chloride and chlorine product are removed from the reactor at a rate of 167 moles per hour and passed to a drying and cooling zone wherein the effluent gases are cooled and dried at a temperature of about 40° C. under 125 p.s.i.g. by contact with sulfuric acid. A substantially anhydrous gaseous mixture containing nitrogen, carbon monoxide, oxygen, unconverted hydrogen chloride and chlorine is withdrawn from the drying zone and passed to the lower portion of a chlorine recovery or absorption tower. As the gaseous materials rise to the top of the tower they are scrubbed with a downwardly flowing stream of liquid hydrogen chloride at a temperature of −65° C. under 120 p.s.i.g. The chlorine in the gaseous mixture is absorbed in the liquid hydrogen chloride treating medium which is contacted with the gaseous effluent at a rate of 30 pound moles per hour liquid hydrogen chloride:137 pound moles per hour gaseous effluent. The remaining portion of the vaporous hydrogen chloride in the effluent entering the middle of the tower, vaporized liquid hydrogen chloride and gaseous inert materials pass to the top of the tower from which this gaseous mixture is withdrawn at a temperature of −65° C. under 120 p.s.i.g. This vaporous mixture is then washed countercurrently with 20 percent aqueous hydrogen chloride to absorb hydrogen chloride while the vaporous inert materials are vented to the atmosphere.

In the bottom of the absorption tower at a temperature of about 21° C., about 99 mole percent of the liquid hydrogen chloride treating medium evaporates in compensation for the heat developed in absorbing the chlorine product. In this way, heat is supplied to evaporate practically all the hydrogen chloride from the liquid chlorine. The liquid removed from the absorption zone which contains actually less than 1 percent hydrogen chloride, is flashed at 21° C. and 100 p.s.i.g. to vaporize the remaining hydrogen chloride and some of the chlorine so that 45 percent of the total liquid is vaporized. This is recycled to the bottom of the tower to reboil the zone. The remaining 55 percent pure liquid chlorine is then recovered from the flashing zone. Alternatively, the liquid chlorine may be evaporated at the pressure at which chlorine gas is desired to supply refrigeration to the process.

Although the example set forth above is restricted to the recovery of chlorine from gaseous mixtures with liquid hydrogen chloride, it is to be understood that bromine or iodine can be recovered from gaseous admixtures containing these halogens in a similar manner by employing the corresponding liquid hydrogen halide absorbent such as hydrogen bromide or hydrogen iodide.

Accordingly, the present invention relates to a process for recovering a halogen selected from the group consisting of chlorine, bromine and iodine from a substantially anhydrous gaseous mixture containing the halogen, the corresponding halogen halide and inert gases which comprises contacting, preferably in a countercurrent manner, the gaseous mixture with anhydrous liquid hydrogen halide, wherein the halogen atom in the halide is the same as the halogen in the gaseous mixture, in an absorption zone at a temperature and pressure sufficient to maintain a minor portion, preferably less than 10 mole percent, of the hydrogen halide in the liquid phase; absorbing and condensing the halogen in the anhydrous liquid hydrogen halide while vaporizing hydrogen halide; withdrawing inert gases and hydrogen halide vapor, from the absorption zone; separately withdrawing the resulting anhydrous liquid halogen-hydrogen halide mixture from the absorption zone and utilizing the heat of absorption to evaporate at least a major portion of the liquid hydrogen halide from the liquid halogen; and recovering the halogen as a product of the process.

The evaporated or flashed hydrogen halide vapors in the present process can be used in several ways, for example, if desired, it can be used to reboil the absorption zone, it can be cooled to liquefication and recycled to the absorption zone as anhydrous liquid hydrogen halide absorption medium therein, or it can be used after proper cooling as refrigerant medium for the absorption zone in cooling coils.

During the absorption operation in the above described or first absorption zone, the hydrogen halide which is vaporized, is removed from the absorption zone with the inert gases and hydrogen halide from the gaseous mixture. The hydrogen halide can be regenerated from this stream by absorbing the vaporous hydrogen halide of the gaseous effluent in an aqueous solution of hydrogen halide in a second absorption zone while venting inert gases from the process to the atmosphere. This second absorption may be carried out under adiabatic conditions. The resulting hydrogen halide enriched aqueous solution (the aqueous concentrated hydrogen halide) can be then flashed at a temperature between −50 and 150° C. to recover hydrogen halide vapors which are dried and cooled to the temperature employed in the absorption zone. This anhydrous liquid hydrogen halide can then be recycled to the absorption zone.

If desired, the anhydrous hydrogen halide recovered from the aqueous hydrogen halide solution can be combined with the hydrogen halide vapors separated from the halogen product and the resulting mixture cooled to liquefication prior to recycle to the absorption zone at the temperature employed therein. The cooled recycle hydrogen halide is preferably introduced into the upper portion of the absorption zone in separate streams one above the other. Alternatively, the anhydrous hydrogen halide recovered from the aqueous hydrogen halide solution can preferably be cooled to liquefication and recycled to the first absorption zone at the temperature employed therein while the hydrogen halide vapors separated from the halogen are passed to the lower portion of the first absorption zone to reboil the zone.

For a better understanding of the present invention, the following detailed description of the invention is made with reference to the attached drawings forming a part of the present application and wherein the features described represent suitable arrangements for carrying out the process of the present invention.

As shown in FIGURE 1, a gaseous feed mixture containing chlorine admixed with water, oxygen, carbon monoxide and nitrogen is passed from line 2 into drying zone 4 wherein water is removed by means of line 6. The dried gaseous mixture is then passed by means of line 8 into absorption tower 10 wherein the gases, in their passage upwardly through the tower are cooled to a temperature between about −80° C. to 0° C. by means of cooling coil 12 and by countercurrent contact with cold anhydrous liquid hydrogen chloride entering the top of the absorption tower from line 14. The chlorine in the dehydrated gaseous mixture is condensed and absorbed by the anhydrous liquid hydrogen chloride and passes to the bottom of the tower while a major portion of the anhydrous liquid hydrogen chloride is vaporized and passes to the top of the tower along with uncondensed nitrogen, oxygen and carbon monoxide. This gaseous mixture is removed from tower 10 by means of line 32. The tower is operated under a pressure of from 50 to 200 p.s.i.g. sufficient to maintain a minor portion of the anhydrous hydrogen chloride in the liquid state. The liquid anhydrous hydrogen chloride with absorbed chlorine preferably containing less than 10 mole percent hydrogen chloride is removed from the bottom of tower 10 by means of line 16 and passed to hydrogen chloride vaporizer 18 wherein hydrogen chloride vapors are separated from liquid chlorine by flashing the mixture. The liquid chlorine is recovered in a substantially pure state by means of line 20 and the hydrogen chloride vaporized from zone 18 are withdrawn by means of line 22 and used to reboil the lower portion of tower 10 by passage through recycle line 24. As an alternate, vaporous hydrogen chloride in line 22 can be passed to cooler 26, cooled to the temperature of the liquid absorbent and recycled to absorption tower 10 in a separate stream by means of line 28 or in admixture with the anhydrous liquid hydrogen chloride feed by means of line 30.

Still another alternate method for treating the vapors withdrawn in line 22 from vaporizer 18 is shown in FIGURE 3. In FIGURE 3 the vapors in line 22, instead of being passed to cooler 26, are passed to compressor 56 wherein the vapors are compressed to a liquid. The liquefied vapors are then recycled to tower 10 by means of line 28 and/or line 30 as explained above.

As a further and particular embodiment of the present invention, the hydrogen chloride in the vaporous mixture withdrawn by line 32 in FIGURE 1 can be recovered and recycled to absorption tower 10 to supply a major portion of the anhydrous liquid hydrogen chloride feed thereto. The recovery steps are shown in FIGURE 2. In this recovery operation, the gaseous mixture from line 32 enters a wash tower 34 wherein it is countercurrently contacted with aqueous hydrogen chloride entering the top of the wash tower through line 36. The aqueous hydrogen chloride wash absorbs and condenses the hydrogen chloride in the gaseous mixture and the uncondensed nitrogen, carbon monoxide and oxygen are vented from the top of the wash tower by means of line 38. The condensate is passed by means of line 40 into flashing zone 42 wherein anhydrous hydrogen chloride is vaporized and withdrawn by means of line 44 and the remaining liquid aqueous hydrogen chloride is withdrawn from zone 42 and recycled to zone 34 by means of lines 46 and 36. The vaporous hydrogen chloride in line 44 is passed to dryer 48 wherein remaining traces of water are separated from the acid and vented from the dryer by means of line 50. The dried hydrogen chloride vapors are then passed from zone 48 through line 52 into cooler 54 wherein it is condensed and cooled to the operating temperature of absorption tower 10 between about −100° C. and about 0° C. The resulting liquid hydrogen chloride in the anhydrous state can then be recycled to the top of tower 10 by means of lines 52 and 14.

Having thus described my invention I claim:

1. A process for recovering chlorine from a substantially anhydrous gaseous mixture containing chlorine, hydrogen chloride and inert gases which comprises countercurrently contacting the gaseous mixture with anhydrous liquid hydrogen chloride in an absorption zone at a temperature between about −100° C. and about 0° C. and about 50 p.s.i.g. and about 200 p.s.i.g., absorbing chlorine in the anhydrous liquid hydrogen chloride under pressure conditions sufficient to maintain some and less than 10 mole percent of the hydrogen chloride in the liquid phase while condensing substantially all of the chlorine, withdrawing the inert gases and hydrogen chloride vapors from the absorption zone, separately withdrawing the condensate together with the remaining liquid hydrogen chloride to a separate zone, flashing the hydrogen chloride from chlorine product and using the flashed vapors to reboil the absorption zone, and recovering chlorine in a pure, dry state from the flashing zone.

2. A process for recovering a halogen selected from the group consisting of chlorine, bromine and iodine from an anhydrous gaseous mixture containing the halogen, the corresponding halogen halide and inert gases which comprises contacting, in an anhydrous atmosphere, the gaseous mixture with anhydrous liquid hydrogen halide, wherein the halogen atom of the anhydrous liquid halide is the same as the halogen in the gaseous mixture, in an absorption zone at a temperature and pressure sufficient to maintain a minor portion of the halogen halide in the liquid phase; absorbing and condensing the halogen in the anhydrous liquid hydrogen halide; withdrawing inert gases and hydrogen halide vapor from the absorption zone; separately withdrawing the resulting liquid halogen-hydrogen halide mixture from the absorption zone and utilizing heat of absorption contained in the withdrawn-liquid mixture to evaporate at least a major portion of the liquid hydrogen halide from the liquid halogen in a vaporization zone and recovering the halogen as the product of the process.

3. A process for recovering a halogen product selected from the group consisting of chlorine, bromine and iodine from a substantially anhydrous gaseous mixture containing the halogen, the corresponding hydrogen halide and inert gases which comprises countercurrently contacting the gaseous mixture with anhydrous liquid hydrogen halide in an absorption zone, wherein the halogen atom of the halide is the same as the halogen in the gaseous mixture, absorbing the halogen in the anhydrous liquid hydrogen halide at a temperature and pressure sufficient to maintain a minor portion of the hydrogen halide in the liquid phase while condensing the halogen product, withdrawing the inert gases and hydrogen halide vapor from the absorption zone, separately withdrawing the resulting liquid mixture containing condensed halogen and liquid hydrogen halide to a separate zone, supplying heat to the liquid mixture to vaporize residual hydrogen halide from the halogen product and recovering liquid halogen product from the separate zone in a pure, dry state.

4. A process for recovering chlorine from a substantially anhydrous gaseous mixture containing chlorine, hydrogen chloride and inert gases which comprises countercurrently contacting the gaseous mixture with anhydrous liquid hydrogen chloride in an absorption zone, absorbing chlorine in the anhydrous liquid hydrogen chloride at a temperature and pressure sufficient to maintain a minor portion of the hydrogen chloride in the liquid phase while condensing the chlorine, withdrawing the inert gases and hydrogen chloride vapor from the absorption zone, separately withdrawing the resulting liquid mixture containing condensed halogen and liquid hydrogen halides to a separate zone, flashing the resulting liquid mixture to vaporize residual hydrogen chloride from liquid chlorine and recovering chlorine from the separate zone in a pure, dry state.

5. The process of claim 4 wherein the hydrogen chloride separated from the chlorine in the separate zone is compressed, liquefied and recycled to said absorption zone to provide heat to said absorption zone.

6. A process for recovering chlorine from a substantially anhydrous gaseous mixture containing chlorine, hydrogen chloride and inert gases which comprises countercurrently contacting the gaseous mixture with anhydrous liquid hydrogen chloride, absorbing chlorine in the anhydrous liquid hydrogen chloride in a first absorption zone at a temperature and pressure sufficient to maintain a minor portion of the hydrogen chloride in the liquid phase, condensing the chlorine in the anhydrous liquid hydrogen chloride, withdrawing the resulting gaseous mixture comprising hydrogen chloride and inerts from the upper portion of the first absorption zone, absorbing the withdrawn hydrogen chloride in aqueous hydrogen chloride liquid in a second absorption zone and venting inert gases from the second absorption zone, recovering anhydrous hydrogen chloride from the gaseous concentrated hydrogen chloride solution in which it is absorbed, separately withdrawing anhydrous liquid hydrogen chloride absorbent and condensed chlorine from the lower portion of the first absorption zone and in a flashing zone, flashing hydrogen chloride from chlorine, recovering liquid chlorine in a pure, dry state from the flashing zone, cooling the gaseous hydrogen chloride from the flashing zone and the separated anhydrous hydrogen chloride which is recovered from the aqueous concentrated hydrogen chloride solution to liquefication and recycling the resulting liquefied anhydrous hydrogen chloride to the first absorption zone.

7. The process of claim 6 wherein the recycle hydrogen chloride is introduced into the upper portion of the absorption zone in separate streams one above the other.

8. The process of claim 6 wherein the anhydrous hydrogen chloride vapor which is separated from the flashing zone and the anhydrous hydrogen chloride which is recovered from the aqueous hydrogen chloride solution are combined in addition to being cooled before recycle to the first absorption zone.

9. A process for recovering chlorine from a substantially anhydrous gaseous mixture containing chlorine, hydrogen chloride and inert gases which comprise countercurrently contacting the gaseous mixture with anhydrous liquid hydrogen chloride at a temperature between about $-100°$ C. and about $0°$ C. and a pressure of from about 50 p.s.i.g. and about 200 p.s.i.g.; absorbing and condensing chlorine in the anhydrous liquid hydrogen chloride in a first absorption zone in an absorption tower under conditions sufficient to maintain some, and less than 10 mole percent, of the hydrogen chloride in the liquid phase and to provide a gaseous mixture of inerts and hydrogen chloride; withdrawing the resulting gaseous mixture comprising hydrogen chloride and inerts from the upper portion of the absorption zone; separating the gaseous hydrogen chloride from the gaseous mixture in a second absorption zone by adiabatic absorption in aqueous hydrogen chloride liquid; venting the inert vapor from the second absorption zone; flashing the aqueous solution at a pressure below the pressure in the second absorption zone and at a temperature between $-50°$ C. and $+150°$ C. and drying the flashed gaseous stream to recover anhydrous hydrogen chloride; cooling the recovered anhydrous hydrogen chloride to liquefication and recycling this liquid to the upper portion of the first absorption zone; withdrawing the liquid from the lower portion of the first absorption zone, and in a separate zone, flashing the hydrogen chloride from the chlorine product; recovering liquid chlorine product in a pure, dry state from the separate zone and using the flashed vapor from the separate zone to reboil the first absorption zone.

10. The process of claim 9 wherein the maintenance of temperature in the first absorption zone is also aided by indirect heat exchange provided by a refrigeration means around the first absorption zone.

References Cited by the Examiner

UNITED STATES PATENTS

| 2,656,011 | 10/1953 | Frey | 55—71 X |
| 2,868,325 | 1/1959 | Cathala | 55—71 |
| 3,079,231 | 2/1963 | Draper et al. | 23—154 X |

FOREIGN PATENTS 517,129   10/1955   Canada.

REUBEN FRIEDMAN, *Primary Examiner.*

B. NOZICK, *Assistant Examiner.*